26076

June 4, 1963 J. M. BENTLEY ETAL 3,092,824

DIRECT CURRENT DIGITAL TO ANALOG DECODER

Filed Aug. 9, 1961 2 Sheets-Sheet 1

INVENTORS
JOHN M. BENTLEY
JAMES H. BROWN
BY
H. H. Losche
ATTORNEYS

DIRECT CURRENT DIGITAL TO ANALOG DECODER

Filed Aug. 9, 1961 2 Sheets-Sheet 2

INVENTORS
JOHN M. BENTLEY
JAMES H. BROWN
BY
H. H. Losche
ATTORNEYS

United States Patent Office 3,092,824
Patented June 4, 1963

3,092,824
DIRECT CURRENT DIGITAL TO ANALOG DECODER

John M. Bentley, Glen Burnie, and James H. Brown, Severna Park, Md., assignors, by mesne assignments, to the United States of America as represented by the Secretary of the Navy Filed Aug. 9, 1961, Ser. No. 130,430
13 Claims. (Cl. 340—347)

This invention relates to a decoding device for a binary digital computer and more particularly to a direct current digital to analog decoder for decoding the information from the output registers of a binary computer.

It is well recognized in the art of using binary digital computers that information to be computed is oftentimes in alternating current or direct current voltage signals which must be encoded for the computer and, after computations are made, the information must be decoded back to alternating or direct current voltage signal information for desirable use. Many well-known decoders are used in combination with "and" circuits, with tube and diode circuits, with a diode matrix, or with a combination of tubes, diodes, transistors, and "and" circuits or the like, to produce a decoder combination. While these have met with good success, the present invention is intended to simplify a decoder combination which is accurate and reliable for decoding the output register information of a binary digital computer into direct current voltage signal information.

The present invention utilizes primarily transistor and diode combinations to provide switching circuits for translating digital register information into a direct current potential. In this invention a switch driver circuit is adapted to be coupled to the output of each register of a binary digital computer to drive a diode switching circuit in a manner to switch reference direct current voltage to binary weighted resistors which are coupled in common to an amplified output. Each switch driver circuit, diode switch, and binary weighted resistor combination constitutes a channel for each binary digital computer register, each binary weighted resistor representing one each binary digit. The binary weighted resistors progress in the order from the lowest binary digit to the highest binary digit in the order of the base 2 to a power, these powers proceeding from zero upwards by one for each binary weighted resistor until all of the binary digital register outputs are completely channeled. The summing output of the binary weighted resistors on the amplifier output represent in direct current voltage amplitude the binary digital register output combination. The reference direct current voltage applied to the several binary weighted resistors is interrupted periodically to produce a square wave voltage output of about 100 microseconds' duration with approximately a 25% duty cycle. Another diode switching circuit is coupled to the output of the amplifier to clamp the amplifier output to ground during each interruption of the direct current reference voltage. This insures that the amplifier output is zero during the clamping period when the reference direct current voltage is interrupted. It is therefore a general object of this invention to provide a direct current digital to analog decoder which produces an interrupted direct current voltage in amplitude representative of applied binary digital register information.

These and other objects and many of the attendant advantages, features, and uses will become more apparent to those skilled in the art as the description proceeds when considered in conjunction with the accompanying drawings, in which.

Figure 1:
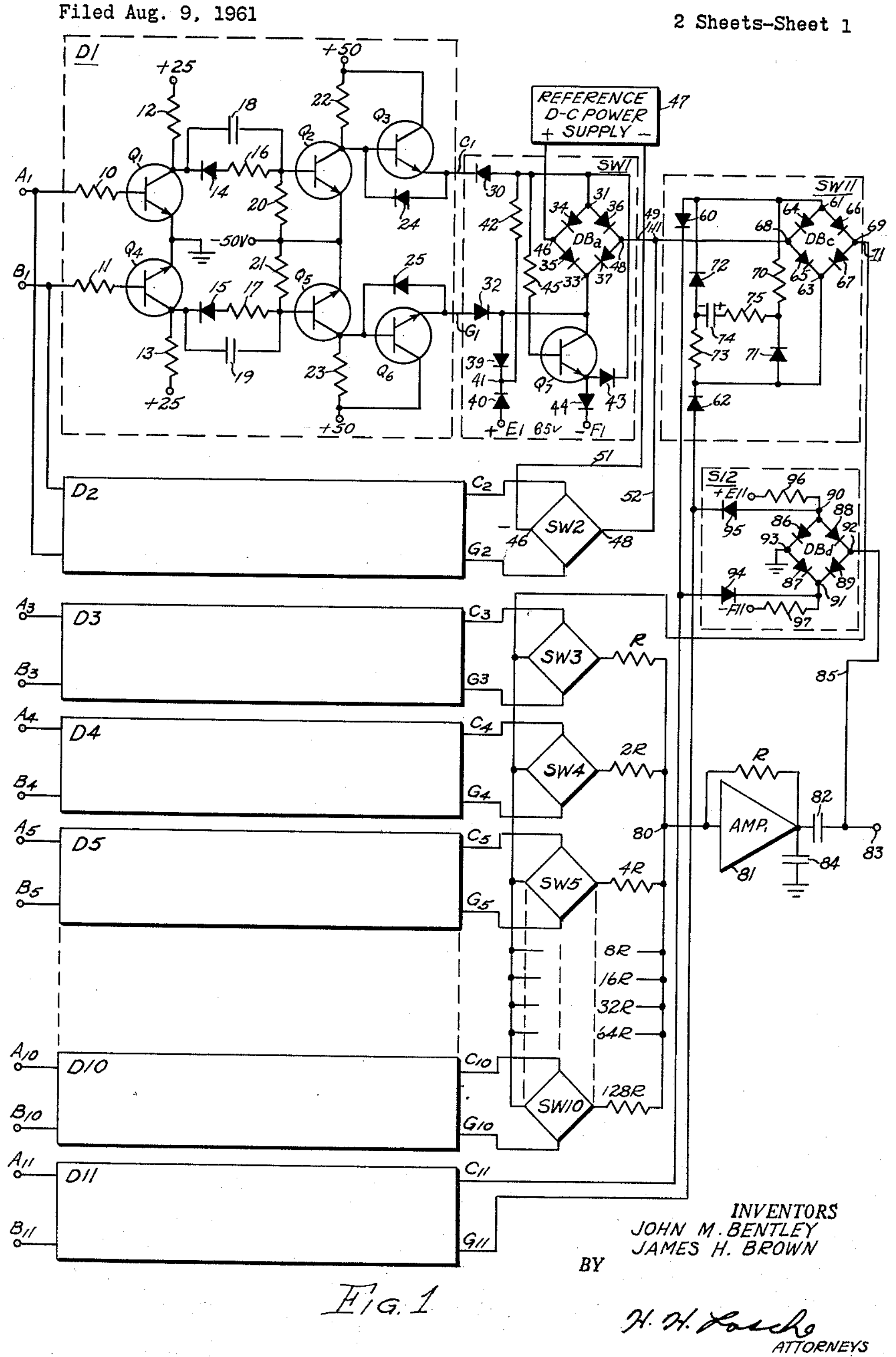
FIGURE 1 is a schematic diagram, partly in circuit schematic and partly in block, illustrating the decoder system of this invention.

Referring more particularly to FIGURE 1, where the complete decoder circuit is shown in block with certain blocks schematically illustrated, the decoder has two inputs A and B for each switch driver circuit D1 through D11 (except for D2) for receiving each digital computer register information. Each pair of terminals A and B are adapted to be coupled to each output digital register of a digital computer (not shown) as from the two anode outputs of the digital register flip-flop or multivibrator circuit as is commonly used for digital registers. It is well understood by those skilled in the art that the digital register flip-flop circuits are alternately anode conducting so that when one anode output produces a positive voltage the other anode output will produce a negative voltage which may be in the order of a positive 1.3 volts and a negative 1.3 volts, respectively.

Terminals A1 and B1 are adapted to be coupled to the output register of a digital computer of the lowest digital number of place whereby A1 and B1 are for voltages applied thereto for example, of +1.3 volts and —1.3 volts, respectively, or vice versa. Terminals A1 and B1 are coupled in reverse order to the inputs of switch driver circuits D1 and D2, only the switch driver circuit D1 being shown in schematic detail since the switch drive circuit D2 as well as switch driver circuits D3 through D10 are identical to the switch driver circuit D1. Terminal A1 is coupled through a resistor 10 to the base of a transistor Q1 while the terminal B1 is coupled through a resistor to the base of a transistor Q4. Since the switch driver circuit D1 is a symmetrical circuit, only the upper half or upper channel of this circuit will be described in detail using even numbered reference characters, the odd number reference charctes advanced by one being applied to like elments or components in the lower half or channel of this circuit. Transistor Q1 is coupled to a positive 25 volt source through an emitter load resistor 12, and the emitter of this transistor is directly coupled to a fixed or ground voltage. The collector of transistor Q1 is likewise coupled through a Zener diode 14 and a resistor 16 in parallel with a capacitor 18 to the base of a transistor Q2. The base of transistor Q2 is coupled through a base bias resistor 20 to a negative voltage source illustrated herein as —50 volts for the later purpose of giving an operative example of the invention. Transistor Q2 is collector coupled through a collector load resistance 22 to a +50 volts source and the emitter of this transistor is coupled directly to the —50 volts source. The collector of transistor Q2 is likewise coupled directly to the base of a transistor Q3 having its emitter coupled back to its base through a diode 24. The collector of transistor Q3 is coupled directly to the +50 volts source and its emitter is coupled to an output conductor C1 to a switch circuit SW1 later to be described. The lower half or channel from the terminal B1 produces an output on the conductor G1 to the switch SW1. The positive voltage sources applied through the collector load resistors 12 and 13 to the transistors Q1 and Q2, respectively, are herein shown as being +25 volts merely for the purpose of illustrating the operation of the switch driver circuit although it is to be understood that the +25 volts, the +50 volts, and the −50 volts may be changed or varied as desired for the use of different circuit elements. Using the voltages as shown and described, the diodes 14 and 15 are 65-volt Zener diodes which are closed in the reverse bias direction whenever 65 volts are exceeded, as is well understood by those skilled in the Zener diode art. For the purpose of example, let it be assumed that +1.3 volts are applied at terminal A1 in which case −1.3 volts will be applied to terminal B1. In this situation the transistor Q1 will be placed in conduction which will bring the collector terminal to substantially zero voltage and this will block any flow of current through the Zener diode. Transistor Q4 will be cut off by virtue of the −1.3 volts applied to its base thereby producing a substantially +25 volts at its collector terminal from the +25 volts collector supply. This places substantially 75 volts across the Zener diode 15 and produces conduction therethrough which will cause voltage division across resistors 17 and 21 sufficiently positive at the junction to cause transistor Q5 to conduct. At the same time the transistor Q2 is biased negative through the biasing resistor 20 from the −50 volts source causing transistor Q2 to be cut off. Since the collector terminal of Q2 is substantially 50 volts positive, the transistor Q3 is placed in conduction to saturation which substantially connects the +50 volts source through the transistor Q3 to the output conductor C1. At the same time, transistor Q5, being conductive, causes sufficient voltage drop across the collector load resistor 23 sufficiently negative to cut off transistor Q6 since the collector of transistor Q5 is directly connected to the base of transistor Q6. The base voltage of transistor Q6 being negative, the output conductor G1 is substantially −50 volts by virtue of the connection through the diode 25. Accordingly, whenever the terminal A1 is positive, the output conductor C1 will be substantially 50 volts positive, and whenever the terminal B1 is negative, the output conductor G1 will be substantially 50 volts negative. In like manner whenever the terminal A1 has a negative voltage applied thereto, the output conductor C1 will have substantially −50 volts thereon, and whenever the terminal B1 has a positive voltage applied thereto, the output conductor G1 will have substantially +50 volts thereon.

The output conductors of the switch driver circuit D1 are applied directly to switch SW1. Since switches SW1 and SW2 are identical, only switch SW1 is shown in detail while switch SW2 is shown in block. The conductor C1 is coupled through a diode 30 to the upper corner terminal 31 of a diode bridge network DB*a*, and the conductor G1 is coupled through a diode 32 to the lower corner terminal 33 of the diode bridge network DB*a*. The corner terminals 31 and 33 are opposite and the diodes 34, 35, 36, and 37 are oriented in the low resistance direction from corner terminal 31 to corner terminal 33. Corner terminal 33 of DB*a* is coupled to a positive voltage teminal E1 through a pair of diodes 39 and 40 oriented in opposing relation, the lower resistance direction of each being toward a common cathode terminal 41 which is coupled to the corner terminal 31 of DB*a* through a resistor 42. The corner terminal 33 of DB*a* is likewise coupled to the collector of a transistor Q7 the emitter of which is coupled through a diode 43 to the corner terminal 31. The base of transistor Q7 is coupled through a resistor 45 to the corner terminal 31. The emitter of transistor Q7 is coupled to the anode of the diode 43 and the corner terminal 31 is coupled to the cathode thereof. The emitter of transistor Q7 is likewise coupled through a diode 44 to the negative terminal F1 of a floating voltage source, the diode 44 being cathode coupled to this terminal F1. The floating voltage source coupled to the terminals E1 and F1 is herein shown as being at a voltage level of 65 volts for the purpose of illustrating the operation of this invention, although other voltages may be used as desired and as circuit changes require. The corner terminal 46 of the diode bridge network DB*a* is coupled to the positive terminal of a reference direct current voltage power supply 47, and the corner terminal 48 coupled through a conductor 49 to an output terminal H1 of the switch SW1. Whenever the input conductors C1 and G1 of the switch SW1 are positive and negative, respectively, the diodes 30 and 32 will block conduction. The 65 floating volts source is applicable from terminal E1 through diode 40, resistance 42 to corner terminal 31, and through both paths of the diode bridge 34, 35 and 36, 37, to the terminal 33. This positive voltage from the E1 terminal is likewise applicable through the resistor 45 to the base of transistor Q7 to produce conduction in which the positive voltage at corner terminal 33 is conducted through transistor Q7 and the diode 44 to the negative floating voltage source F1. This closes the diode switch network from the positive voltage source of the reference direct current power supply 47 through terminal 46, diode 35, transistor Q7, diode 43, corner terminal 31, and diode 36 to the output terminal 48 and output conductor 49 to the terminal H1. This switch SW1 being closed readily connects the positive reference voltage from the source 47 to the terminal H1. At the same time that switch SW1 is closed, switch SW2 is opened by virtue of its switch driver circuit D2 being reversely coupled to the input terminals A1 and B1 such that the conductor C2 has a substantially −50 volts thereon and the conductor G2 has a substantially +50 volts thereon. The input terminal 46 of switch SW2 is coupled by the conductor means 51 to the negative voltage source of the reference voltage power supply 47, and the output terminal 48 is connected by the output conductor 52 to the terminal H1. Since the switch SW1 is closed, the positive reference direct current potential is applied at H1 and this potential is blocked in the switch SW2 by the corresponding diode 35 and transistor Q7 from producing any feedback through the switch SW2.

Under the condition where the conductor C1 has a substantially −50 volts thereon and at which time the conductor G2 will likewise have a −50 volts thereon, the conductors G1 and C2 will have substantially +50 volts thereon. Under this condition there will be current flow from G1 through the diode 32, through diode 39 to terminal 41, and through the resistor 42 back to the conductor C1 through the diode 30. This produces a voltage drop across the resistor 42 which back biases the diode bridge network DB*a*, opening this network as a switch, at which time the positive reference direct current voltage from the supply source 47 is blocked at the bridge network DB*a*. At the same time by virtue of C2 being positive and G2 being negative, switch SW2 will be closed, and the negative direct current potential from the reference direct current power supply 47 will be conducted through switch SW2 from the output terminal 48 over the conductor 52 to terminal H1. This negative reference voltage will likewise be blocked from feedback through the open diode bridge network DB*a* in switch SW1. As may be seen from the above description of operation, if the input voltages to terminal A1B1 change from positive voltage at A1 and a negative voltage at B1 to a negative voltage at A1 and a positive voltage at B1, the reference direct current voltage at the terminal H1 will change from positive to negative.

Terminal H1 is connected as an input to switch SW11 which switch SW11 functions as an interrupter under the control of a switch driver circuit D11 that is adapted to be coupled to one output register of a digital computer at terminals A11 and B11. The output of the switch driver circuit D11 is by way of the conductors C11 and G11, C11 being coupled to the cathode of a diode 60, the anode of which is coupled to the corner terminal 61 of a diode bridge network DB*c*. The output conductor G1 of the switch driver circuit D11 is coupled to the anode of a diode 62, the cathode of which is coupled to the corner terminal 63 of DB*c*, the corner terminals 61 and 63 being opposite with the diodes 64, 65, 66, and 67 being oriented in the low resistance direction from the corner terminal 61 to the corner terminal 63. Corner terminal 68 is coupled to the terminal H1 as an input to this switch, and the corner terminal 69 is coupled to an output terminal I1 for this switch circuit SW11. Corner terminals 61 and 63 of the diode bridge network DB*c* are paralleled by resistor 70 and diode 71, in that series order, from the corner terminal 61 to corner terminal 63. Corner terminals 61 and 63 are also paralleled by a circuit through a diode 72 and a resistance 73, in that series order, the diodes 71 and 72, in both instances being oriented in the low resistance direction from the corner terminal 63 to the corner terminal 61. The terminal connection of diode 72 and resistor 73 is coupled to one plate of a storage capacitor 74, the other plate of which is coupled through a resistor 75 to the common terminal of the resistor 70 and diode 71. When substantially +50 volts is on conductor G11 and substantially −50 volts is on conductor C11, current will flow through the diode 62, through resistor 73, through diode 72, back through diode 60, and also through a parallel path from the diode 62, through diode 71, through resistor 70, and back through the diode 60. This closed circuit establishes a voltage drop across the resistors 70 and 73 to place substantially a −50 volts on the plate of the capacitor coupled to the common terminal of resistor 73 and diode 72 and substantially +50 volts on the plate of the capacitor coupled to the resistor 75. This bias is operative on the diode bridge network to place substantially −50 volts at corner terminal 61 and +50 volts at corner terminal 63 back biasing the diode bridge network DB*c* causing an open circuit between corner terminals 68 and 69. When the polarities of the voltage on C11 and G11 change, the circuit is blocked by the diodes 60 and 62 at which time the storage capacitor 74 will discharge, the positive plate discharging through the resistors 75 and 70 to the corner terminal 61 and the negative plate of the capacitor 74 discharging through the resistor 73 to the corner terminal 63 which now forward biases the diode bridge network DB*c* thereby closing the circuit from H1 to I1 through the corner terminals 68 and 69. A register of the binary digital computer (not shown) is chosen to switch the switch driver circuit D11 in approximately 100 microsecond intervals with an approximate 25% duty cycle so that switch SW11 is switched accordingly. The output at terminal I1 is thereby an interrupted direct current voltage in a positive or negative polarity, depending on the switching conditions of polarity switches SW1 and SW2. The first digital register computer input at A1 and B1, accordingly, determines polarity of the reference direct current voltage, and the digital register input at terminals A11 and B11 determines the interruption frequency.

The remaining binary digital computer register inputs to switch driver circuits D3 through D10 determine the amplitude of the reference direct current voltage in correspondence with the register input information. Each switch driver circuit D3 through D10 is coupled to drive switch circuits SW3 through SW10 in their respective channels. The output of switch circuit SW3 is to a binary weighted resistor R, the output of switch SW4 is to the binary weighted resistor 2R, the output of switch SW5 is to the binary weighted resistor 4R, et cetra, through the several register channels shown in the drawing as being to channel 10 in which the switch SW10 output is to the binary weighted resistor 128R. These resistors may be in the order of 20,000 ohms, 40,000 ohms, 80,000 ohms, et cetra, through 128,000 ohms, respectively. All of the binary weighted resistors R through 128R are coupled in common to a terminal point 80. Terminal 80 is coupled as an input to an amplifier 81 having a feedback through resistance R. The feedback resistance R is identical to the resistance R of the binary weighted resistors for the purpose of developing the proper gain through the amplifier in accordance with the binary weighted resistors. The output of amplifier 81 is through a coupling capacitor 82 to an output terminal 83, the output being also coupled to ground through a capacitor 84 for filtering or smoothing the direct current output voltage. The output 83 of the amplifier 81 is coupled through a conductor 85 to a grounding switch SW12.

Grounding switch SW12 consists of a diode switching bridge circuit DB*d* having diodes 86, 87, 88, and 89 oriented in a low resistance direction from the corner terminal 90 to the corner terminal 91. The conductor 85 is connected to corner terminal 92, and corner terminal 93 is directly connected to ground. Corner terminal 91 is coupled to the cathode of a diode 94, the anode of which is directly coupled to the conductor C11 from the diode switching circuit D11. The corner terminal 90 is connected to the anode of a diode 95 the cathode of which is directly connected to the conductor G11 of the switch driver circuit D11. Corner terminal 90 is also coupled through a resistance 96 to the positive terminal E11 of a floating voltage source while the corner terminal 91 is coupled through a resistance 97 to the negative terminal F11 of the floating voltage source. Whenever the voltage on the conductor C11 is substantially +50 volts, the switch SW11 is closed as hereinbefore stated. The substantially +50 volts on conductor C11 will be conducted through the diode 94 and the resistance 97 to the negative terminal F11 of the floating voltage source, and the substantially −50 volts on the conductor G11 will establish a circuit through the diode 95 and resistance 96 to the +E11 voltage terminal of the floating voltage source. This back biases the diode bridge network DB*d* opening the circuit between the corner terminals 92 and 93. During the time the switch SW11 is closed and switch SW12 is opened, the positive or negative reference direct current voltage is applied in common to the switches SW3 through SW10, those switches which are closed conducting the reference voltage to the respective binary weighted resistors R through 128R, the summed output of these being at terminal 80 and amplified in the amplifier 81 to produce the analog direct current voltage at terminal 83 of the binary digital register input combination at terminals A1B1 through A11B11. If the switch driver circuit D11 switches to place a substantially −50 volts in C11 and substantially +50 volts on G11, the interrupter switch SW11 will be opened and switch SW12 will be closed. Switch SW12 will be closed by virtue of the diodes 94 and 95 blocking the negative voltage on C11 and the positive voltage on G11. The floating voltage source at E11 and F11 is now operative to forward bias the diode bridge network BD*d* to ground the output 83 of the amplifier 81 through the corner terminals 92 and 93 of bridge DB*d*. Accordingly, when the reference direct current voltage from the source 47 is interrupted by the interrupter switch SW11, the amplifier 81 is grounded which insures zero voltage on its output.

Switches SW3 through SW10 are all identical and function as single-pole-double-throw switches. Each of these switches consist of the combination of switch SW11 and switch SW12 with the corner terminals 69 and 92 coupled in common. For this purpose the conductors C11 and G11 become conductors C3 G3, C4, G4, et cetera, for whichever channel the switch is operating. Using the combination of switch SW11 and SW12 in, for example, the switch SW3, whenever the switch driver circuit D3 produces a positive voltage on the output conductor C3 and likewise a negative voltage on the output conductor G3, the upper switch corresponding to switch SW11 will be closed and the lower switch corresponding to SW12 will be open. This allows the output of switch SW11 at point I1 to be conducted through the switch to the binary weighted resistor R. If the voltages on C3 and G3 are reversed by the switch driver circuit D3, the upper switch corresponding to SW11 would be opened and the lower switch coresponding to SW12 would be closed, which would ground the binary weighted resistor R.

Figures 2, 3, 4:
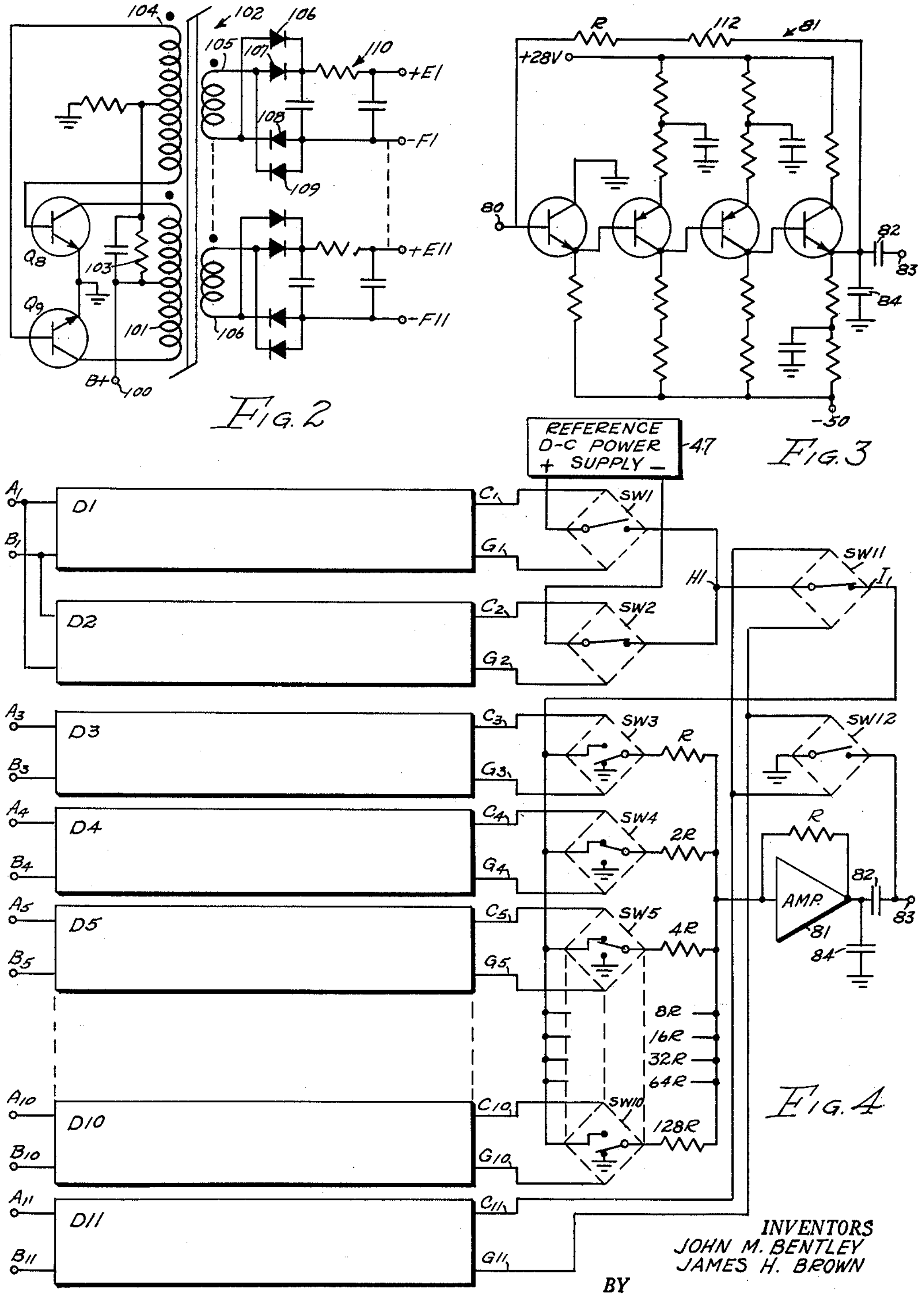
FIGURE 2 is a circuit schematic diagram showing the means of generating the floating voltage supply sources required for the several diode switching networks.
FIGURE 3 is a circuit schematic diagram of the amplifier shown in block in FIGURE 1.
FIGURE 4 is a pseudo block circuit schematic diagram of the decoder shown in FIGURE 1 with the diode switching networks shown as simple blade switches without the switch control networks to simplify the example of operation of the invention.

Referring more particularly to FIGURE 2, the floating voltage supplies required by the several switches SW1 through SW12 are produced by a device illustrated in this figure which may take the form of a chopped direct current voltage in the output of 11 secondaries rectified to produce the eleven separate floating voltages. In this illustrated floating voltage supply source, the direct current voltage applied at the B+ terminal 100 is conducted to the center tap of a primary winding 101 in transformer 102, the end windings of the primary winding 101 being connected to collector terminals of respective transistors Q8 and Q9 which are emitter grounded. The direct current B+ voltage is applied through a dropping resistor 103 to the center tap of a second primary winding 104, the end windings of which are directly coupled to the bases of transistor Q8 and Q9, respectively. This primary input circuit chops the direct current voltage which is induced in the eleven secondary windings only two secondary windings 105 and 106 being shown since these secondaries are identical in circuit formation. Each secondary is coupled through diodes 106, 107 and 108, 109 oriented to produce a positive voltage at terminal E and a negative voltage at terminal F. Each secondary output has a filter circuit 110 for filtering out any ripple in the direct current voltage. This circuit operates as a direct current-to-direct current converter. The positive and negative terminals E and F of each secondary are coupled respectively to the switch circuits SW1 through SW10 and SW12 since each switch circuit must have its floating voltage supply separate and independent of all other switching circuits.

Referring more particularly to FIGURE 3, the amplifier 81 is shown in circuit schematic of a four-stage transistor amplifier which is a conventional direct current coupled amplifier with a feedback through resistance R of the same resistance as the resistance R in the binary weighted resistors to control the gain of the amplifier relative to the binary weighted resistance summed input to the amplifier. A second resistor 112 in series with resistance R compensates to adjust for the closed loop gain of the amplifier and for temperature stability of the amplifier. Since the amplifier 81 is conventional and its operation apparent from the circuit schematic shown, it will not be described further herein.

Referring more particularly to FIGURE 4, there is shown a simplified schematic of the decoder fully shown in FIGURE 1. The schematic of FIGURE 4 is intended only to simplify the statement of operation of this invention and is not in any way to be considered as operational, it being necessary to refer to FIGURE 1 for a complete understanding of the operation of the invention. Switches SW1 through SW12 are arbitrarily set in this figure to provide one example of operation of the decoder, it being understood that these switches are all under the control of their respective switch driver circuits which are driven in accordance with the binary digital computer register input at terminals A1B1 through A11B11. For the purpose of this example let it be assumed that A1 is negative and B1 is positive whereupon C1 and G2 will be negative and G1 and C2 will be positive. The switch driver circuits D1 and D2 having these outputs will cause switch SW1 to be opened and switch SW2 to be closed in which case there will be a negative reference direct current voltage from the direct current reference voltage supply 47 at the terminal H1 of the polarity selecting switches SW1 and SW2. At this moment assume that a positive voltage is applied at terminal A11, and accordingly, a negative voltage at B11 to produce a positive voltage on C11 and a negative voltage on G11 which will cause switch SW11 to be closed and switch SW12 to be opened. In this situation the negative reference voltage from terminal H1 is conducted through switch SW11 to terminal I1 which is applied in common to switches SW3 through SW10. The terminals A3 and B3 have negative and positive voltage applied thereto, respectively, producing negative and positive voltage on the output conductors C3 and G3, respectively, of switch driver circuit D3 which controls switch SW3 to connect the binary weighted resistor R to ground. Switch driver circuits D4 and D5 each have positive voltage applied at input A terminals and negative voltage at input B terminals producing positive output voltage on the C terminals, and negative output voltages on the G terminals to cause switches SW4 and SW5 to connect the negative direct current reference voltage from terminal I1 to the ends, respectively, of resistors 2R and 4R. For the purpose of example, let it be assumed that the channels between channels 5 and 10 are in a switched position as shown by channel 10 in which the A terminals have a negative voltage applied and the B terminal a positive voltage applied to cause all the switches SW6 through SW10 to be in the grounded position. In this example the negative direct current reference voltages applied to binary weighted resistors 2R and 4R produce a direct current voltage amplitude result at the terminal 80 which is amplified by the amplifier 81 to produce at the output terminal 83 negative direct current voltage being the analog voltage representative of the binary digital computer register input combination. When the input voltages at A11 and B11 switch to cause the terminal A to be negative and the terminal B to be positive and thereby the conductor C11 negative and the conductor G11 positive, switch SW11 will interrupt the negative direct current reference voltage applied from terminal H1 to I1 and cause switch SW12 to ground the output of the amplifier 81 to insure that the amplifier 81 will have a zero voltage output during the interrupted interval produced by switch SW11. In this manner the binary digital register input will condition the decoder by switching the various switch circuits to produce an analog interrupted direct current voltage at the output of the amplifier 81 at terminal 83 which will be representative of the binary digital computer register input combination.

While many modifications and changes may be made in the constructional details and features of this invention by changing voltage values or polarities or by making other modifications not departing from the intended purpose of this invention, we desire to be limited only by the spirit and scope of the appended claims.

We claim:

1. A direct current digital to analog decorder comprising: a direct current reference voltage having outputs of both polarities; a polarity selecting switch means coupled to both outputs of said direct current reference voltage to produce the selected polarity on a single output thereof; an amplifier having an input and an output; a plurality of binary weighted resistors having output ends coupled in common to said amplifier input; a plurality of digit switch means having the inputs thereto coupled in common to said polarity selecting switch single output and their respective outputs coupled respectively to the input end of one each binary weighted resistor for selectively switching the direct current voltage of selected polarity to said resistors; and switch driver circuits each having an input to receive a digital binary register voltage signal and each having an output, the output of one switch driver circuit being coupled to said polarity selecting switch means and the outputs of the remaining switch driver circuits being coupled respectively to one each of said digit switch means to control the switching of said polarity selecting switch means and said digit switch means in accordance with the digital binary voltage register signal combination whereby a direct current analog voltage is produced on the output of said amplifier of said digital binary voltage signal combination.

2. A direct current digital to analog decoder comprising: a direct current reference voltage having voltage output of both polarities; a polarity selecting switch means coupled to both outputs of said direct current reference voltage to conduct the reference voltage of selected polarity on a single output thereof; interrupter switch means coupled to the polarity selecting switch means single output to conduct interrupted direct current voltage on an output thereof; an amplifier having an input and an output; a plurality of binary weighted resistors having output ends coupled in common to said amplifier input; a plurality of digit switches having two inputs with one of the inputs of each coupled in common to said interrupter switch means output and each having an output coupled respectively to the input end of one each of said binary weighted resistors to selectively switch interrupted direct current reference voltage of selected polarity to said binary weighted resistors; and a plurality of switch driver circuits each having an input for receiving a binary digital voltage signal from a binary counter register and having an output, the output of one switch driver circuit being coupled to control said polarity selecting switch means, the output of another switch driver circuit being coupled to control said interrupter switch means, and the remainder of said switch driver circuits having the outputs thereof coupled respectively to the other input of one each digit switch means whereby the amplifier output conducts an interrupted direct current voltage of a polarity representing the analog of the digital binary voltage signal combination applied as inputs to said switch driver circuits.

3. A direct current digital to analog decoder for binary digital computers comprising: a direct current reference voltage having voltage output of either polarity; a polarity selecting switch means coupled to said direct current reference voltage to conduct the selected polarity of said reference voltage on a single output thereof; interrupter switch means coupled to the single output of said polarity selecting switch means to conduct interrupted direct current voltage on an output thereof; an amplifier having an input and an output; a plurality of binary weighted resistors having output ends coupled in common to said amplifier input; a plurality of digit switches having two inputs with one input of each coupled in common to said interrupter switch output and respectively to the input end of one each of said binary weighted resistors to selectively switch said direct current reference voltage of selected polarity to said binary weighted resistors; a grounding switch coupled to the output of said amplifier; and switch driver circuits each having a digital binary register input thereto and an output, the output of one switch driver circuit being coupled to control said polarity selecting switch, the output of another switch driver circuit being coupled to control said interrupter switch and said grounding switch alternately in conduction phases, and the remainder of said switch driver circuits having the outputs thereof coupled respectively to the other input of one each digit switch means whereby direct current voltage conducted through the binary weighted resistors will produce on the amplifier output a direct current analog voltage of the binary digital input to said switch driver circuits in accordance with polarity selection and alternate interruptions and amplifier grounding thereof.

4. A direct current digital to analog decoder as set forth in claim 3 wherein said digital switch means includes a pair of diode bridge switching networks to function as single-pole-double-throw switches which in one switched condition connects the interrupted direct current reference voltage to the respective binary weighted resistor and in the other switched condition connects said respective binary weighted resistor to a ground potential.

5. A direct current digital to analog decoder as set forth in claim 4 wherein said interrupter switch means and said grounding switch means controlled by one switch driver circuit to switch same in alternate conduction phases are diode switch networks which are opened and closed alternately in accordance with forward and back biasing thereof.

6. A direct current digital to analog decoder as set forth in claim 5 wherein said polarity switch means include a pair of switches, each having a diode bridge network in combination with a transistor collector and emitter coupled in parallel across one pair of opposite corners of said diode bridge network, said one pair of opposite corners being said coupling from the respective switch driver circuit for controlling the biasing and back biasing of said diode bridge network and said transistor, and the other pair of opposite corners of said diode bridge network being coupled as the input and the output of the switch, the input to one diode bridge network being coupled to the positive polarity output of said direct current reference voltage and the input to the other diode bridge network being coupled to the negative polarity output of said direct current reference voltage, the outputs being coupled in common, and said respective switch driver circuits reversely biasing said diode bridge networks and related transistor to cause alternate closing of said pair of switches.

7. A direct current digital to analog decoder as set forth in claim 6 wherein said diode switch networks of said interrupter switch means and said grounding switch means each comprise a diode bridge network having one pair of opposite corners being the coupling to the switch driver circuit controlling same, diodes being in said coupling between said switch driver circuit and said diode bridge network of each interrupter and grounding switches in reversed orientation to alternately close said interrupter and grounding switches by alternate reverse biasing of said diode bridge networks.

8. A direct current digital to analog decoder as set forth in claim 7 wherein said binary weighted resistors progress from the lowest representative binary digit to the highest representative binary digit on the order of base 2 to a power, said power increasing by one from zero to the highest resistor whereby each binary weighted resistor has a resistance representative of the corresponding binary digital number producing the binary digital voltage signal.

9. A direct current digital to analog decoder as set forth in claim 8 wherein said amplifier has a resistor coupled feedback circuit, the resistance of which is equal to the resistance representative of the digit of least significance to control the gain of said amplifier in correspondence with the binary weighted resistors.

10. A diode switching means for a direct current digital to analog decoder with a switch driver circuit comprising: a diode bridge circuit having four corner terminals with a diode between each of two corner terminals, said diodes being oriented in the low resistance direction from opposite first and third corner terminals; a positive and negative control voltage applied from the decoder switch driver circuit, capable of reversing polarity, to said first and third corner terminals through diodes with the control voltage diodes oriented in opposite low resistance directions; two parallel circuits coupled across said first and third corner terminals, each parallel circuit consisting of a diode and a resistance in reverse order, and a capacitor coupled between the terminals of the serially coupled diode and resistance in each parallel circuit, and a voltage to be switched coupled to said second and fourth corner terminals of said diode bridge circuit whereby control voltage applied in one polarity relation will back bias the diodes of said diode bridge circuit opening the switch and at the same time charge said capacitor, and upon said control voltage being applied in the other polarity relation will allow said capacitor to discharge through said diode bridge circuit closing said switch for current to flow across said second and fourth corner terminals.

11. A switching circuit functioning as a single-pole-double-throw switch for switching voltage signal information from a source to binary weighted resistors of a decoder comprising: a first and second diode bridge network each having four corner terminals with the diodes oriented for opposite first to third corner terminals; control voltage of reversible polarity applied respectively through a diode to each first and third corner terminal in parallel to each diode bridge network, said control voltage diodes in said parallel coupling to said first and third corner terminals of said first and second diode bridges, respectively, being oppositely oriented in the low resistance direction to block positive voltage from said first corner terminal of said first diode bridge, and said control voltage diodes in said parallel coupling to said third and first corner terminals of said first and second diode bridge networks being oppositely oriented in the low resistance direction with positive voltage blocked from said first corner terminal of said second diode bridge network; and a reference voltage to be switched coupled to the second corner terminal as an input and to the fourth corner terminal as an output of said first diode switch network, said fourth corner terminals of said first and second diode bridges being coupled in common, and said second corner terminal of said second diode bridge network being coupled to ground whereby control voltage of reversible polarity will alternately switch said diode bridge networks in an oppositely phased open and closed manner to connect said reference voltage to the switch output and to ground the output.

12. A switching circuit as set forth in claim 11 wherein said first diode bridge network is biased and reverse biased to close and open, respectively, said circuit as a switch with said reversible polarity control voltage, applying, in one polarity condition, a reverse bias on said first diode bridge network, and a storage capacitor coupled to said first diode bridge network in a manner to charge under said one polarity condition of said reversible polarity control voltage and to discharge in the other polarity condition of said reversible polarity control voltage through said first diode bridge network to close same for the conduction of said reference voltage.

13. A switching circuit as set forth in claim 12 wherein said second diode bridge network is back biased by said reversible polarity control voltage under said other polarity condition to open conduction between the second and fourth corner terminals and is biased by a floating voltage source under said one polarity condition of said reversible polarity control voltage to close the connection between said second and fourth corner terminals of said second diode bridge network.

References Cited in the file of this patent

UNITED STATES PATENTS 3,030,619 Ostrov -------------- Apr. 17, 1962